United States Patent
Yoshizawa et al.

(10) Patent No.: US 6,230,851 B1
(45) Date of Patent: May 15, 2001

(54) AIR DISC BRAKE

(75) Inventors: Shigeru Yoshizawa; Kazuyuki Sakai, both of Tokyo (JP)

(73) Assignee: Akebono Brake Industry Co., Ltd., Tokyo (JP)

( * ) Notice: Subject to any disclaimer, the term of this patent is extended or adjusted under 35 U.S.C. 154(b) by 0 days.

(21) Appl. No.: 09/402,422

(22) PCT Filed: Feb. 9, 1999

(86) PCT No.: PCT/JP99/00554

§ 371 Date: Oct. 7, 1999

§ 102(e) Date: Oct. 7, 1999

(87) PCT Pub. No.: WO99/41519

PCT Pub. Date: Aug. 19, 1999

(30) Foreign Application Priority Data

Feb. 10, 1998 (JP) .................................................. 10-028934

(51) Int. Cl.[7] ...................................................... F16D 55/00
(52) U.S. Cl. ......................................... 188/71.1; 188/72.3
(58) Field of Search ........................... 188/153 R, 153 D, 188/153 A, 72.4, 73.1, 72.3, 71.1

(56) References Cited

U.S. PATENT DOCUMENTS

| | | | |
|---|---|---|---|
| 3,243,017 | * | 3/1966 | Kleinstuck .............................. 188/73 |
| 3,759,147 | * | 9/1973 | Johnsson et al. ....................... 92/19 |
| 3,955,480 | * | 5/1976 | Wosegien ............................. 92/130 R |
| 3,983,790 | * | 10/1976 | Johannesen ............................ 91/422 |
| 3,993,171 | * | 11/1976 | Tonn ................................... 188/72.4 |
| 4,077,499 | * | 3/1978 | Baram ................................. 188/72.4 |
| 4,793,449 | * | 12/1988 | Smith .................................. 188/107 |
| 4,867,280 | * | 9/1989 | Von Gruenberg et al. ......... 188/72.4 |
| 5,826,686 | * | 10/1998 | Rike .................................. 188/264 G |
| 5,845,747 | * | 12/1998 | Rike et al. .......................... 188/72.4 |
| 5,934,417 | * | 8/1999 | Kobayashi et al. ................. 188/72.3 |
| 6,073,733 | * | 6/2000 | Kapanowski ....................... 188/72.4 |
| 6,079,312 | * | 6/2000 | Plantan .................................. 91/172 |
| 6,116,385 | * | 9/2000 | Ring ................................. 188/153 D |

FOREIGN PATENT DOCUMENTS

| | | |
|---|---|---|
| 46-3866 | 11/1971 | (JP) . |
| 56-141863 | 10/1981 | (JP) . |
| 58-5541 | 1/1983 | (JP) . |
| 60-49141 | 3/1985 | (JP) . |
| 63-11936 | 1/1988 | (JP) . |
| 7-9956 | 1/1995 | (JP) . |

* cited by examiner

Primary Examiner—Robert J. Oberleitner
Assistant Examiner—Benjamin A. Pazzlo
(74) Attorney, Agent, or Firm—Morgan, Lewis & Bockius LLP

(57) ABSTRACT

It is an object to obtain an air disc brake in which reduction in size, in weight, and in cost can be attained, and the responsibility can be improved easily. A pair of leg portions 15*a* in opposition to each other so as to put therebetween a rotor 3 are provided in a caliper body 15 fixed to a truck frame 7, a pair of brake blocks 14 disposed in opposition to each other so as to put therebetween the rotor 3 are attached to air chambers 17 built in the leg portions 15*a* respectively, each of the air chambers 17 includes a diaphragm 27 which is displacable to the rotor 3 side by a supplied air pressure, a piston 29 having a base end in contact with the diaphragm 27 and a tip end connected to the brake block 14, and a return spring 31 for urging the piston 29 to move apart from the rotor 3.

2 Claims, 4 Drawing Sheets

AIR DISC BRAKE

TECHNICAL FIELD

The present invention relates to an air disc brake in which a pair of brake blocks disposed oppositely across a disc-like rotor rotating integrally with a wheel are pressed against the rotor by air pressure to thereby generate a braking force. Particularly it relates to an air disc brake adapted for a railroad vehicle.

BACKGROUND ART

As an air disc brake for a railroad vehicle, a lever-operated air disc brake as shown in FIG. 4 has been proposed in Japanese Patent Unexamined Publication Hei. 7-9956, or the like.

The air disc brake 1 is configured as follows. A pair of brake blocks 4, 4 are disposed in opposition to each other so as to put therebetween a disc-like rotor 3 rotating integrally with a wheel 2. The brake blocks 4, 4 are driven by a pair of lever members 6, 6 and a single air chamber 8. The tip ends of the lever members 6, 6 are connected to the brake blocks 4, 4 respectively, and the single air chamber 8 is disposed between the opposite base end portions of the pair of lever members 6, 6 so as to turn the level members 6, 6.

The air chamber 8 is provided fixedly to a truck frame 7 of a railroad vehicle. When air pressure is supplied to the air chamber 8, a pair of operation plates 8a connected to the lever members 6 respectively are displaced so as to project out in the directions of the arrows (a) to thereby turn the lever members 6 around rotation fulcrums 9 in the directions of the arrows (b) respectively so that the brake blocks 4 are pressed against the rotor 3.

The lever members 6 are urged by return springs 10 respectively in the directions that the brake blocks 4 are separated from the rotor 3.

In the aforementioned lever-operated air disc brake, however, there arose a problem that not only the number of parts increased but also the size, weight and cost increased because of provisions of the lever members 6 and a mechanism for rotatably supporting the lever members 6.

Further, since the lever-operated air disc brake was configured so that the swelling displacement of the air chamber 8 caused by the supply of air pressure was transmitted to the brake blocks 4 through the lever members 6, the responsibility of the brake blocks 4 was lowered correspondingly to the interposition of the lever members 6 even in the case where air pressure supply control was performed at a high speed. Therefore, there arose a problem that the high-speed air pressure control was hardly reflected in improvement of the responsibility of the brake blocks 4.

Further, in the case of a railroad vehicle, there was a possibility that an axle might be moved within a range of about ±7 mm in an axial direction, a vertical direction or another direction at the time of braking. In the case of the aforementioned lever-operated air disc brake, an impact load acted on the rotation fulcrums 9 or the lever members 6 because of the aforementioned movement of the axle at the time of braking. Accordingly, there was a problem that constituent parts were fatigued easily.

The present invention is designed upon the aforementioned circumstances, and an object of the present invention is to provide an air disc brake in which the number of parts can be reduced to thereby attain reduction in size and weight and reduction in cost and in which air pressure supply control can be performed at a high speed to thereby improve responsibility easily. Further, it is another object of the present invention to provide an air disc brake in which an impact load acting on constituent parts due to the movement of an axle at the time of braking can be relaxed to thereby reduce the fatigue of the constituent parts caused by the impact load. Thus, the air disc brake according to the present invention is particularly adapted for a railroad vehicle.

DISCLOSURE OF INVENTION

In order to achieve the above object, according to the present invention, there is provided an air disc brake in which a pair of brake blocks disposed in opposition to each other so as to put therebetween a rotor rotating integrally with a wheel are pressed against the rotor by air pressure to thereby generate a braking force, wherein a pair of leg portions in opposition to each other so as to put therebetween the rotor are provided in a caliper body fixed to a truck frame, the pair of leg portions being provided with cavities serving as spaces for receiving air chambers respectively; and each of the air chambers includes a housing plate material attached to the leg portion so as to cover the cavity and provided with air pressure supply port formed therein, a diaphragm defining a pressure chamber in the cavity and between the housing plate material and the diaphragm so that the diaphragm is moved in the cavity so as to be swollen toward the rotor side by air pressure supplied to the pressure chamber, a piston having a base end in contact with the diaphragm and a tip end protruded from the cavity and provided with a head portion connected to the brake block, and a return spring provided in the cavity for urging the piston to move apart from the rotor.

Further, according to the aforementioned configuration, the swelling displacement of the air chambers is directly transmitted to the brake blocks. In comparison with the conventional air disc brake having lever members and mechanisms of rotatably supporting the lever members, not only the number of parts can be reduced by the omission of the lever members and the mechanisms of supporting the level members to thereby simplify the structure but also response lag due to members interposed between the air chambers and the brake blocks can be eliminated.

Further, the movement of the axle at the time of braking is permitted by the elastic deformation of the diaphragms and return springs supporting the pistons in the air chambers so that an impact load acting due to the movement of the axle at the time of braking can be relaxed.

Preferably, in the above air disc brake, the return spring may be a spiral type compression coiled spring which is formed so that the diameter of winding of a spring wire material is reduced gradually in a direction of from one end side to the other end side.

In such a configuration, the return springs are configured so that the small-diameter spring wire is set in the inside of the large-diameter spring wire in the case where the return springs are compressively deformed by the swelling displacement of the diaphragms, so that the space occupied by the return springs in the axial direction becomes very small. Accordingly, the return springs can be set in cavities of the leg portions of the caliper body so as to save a space. This can contribute to reduction in size of the brake apparatus.

Figure 1:
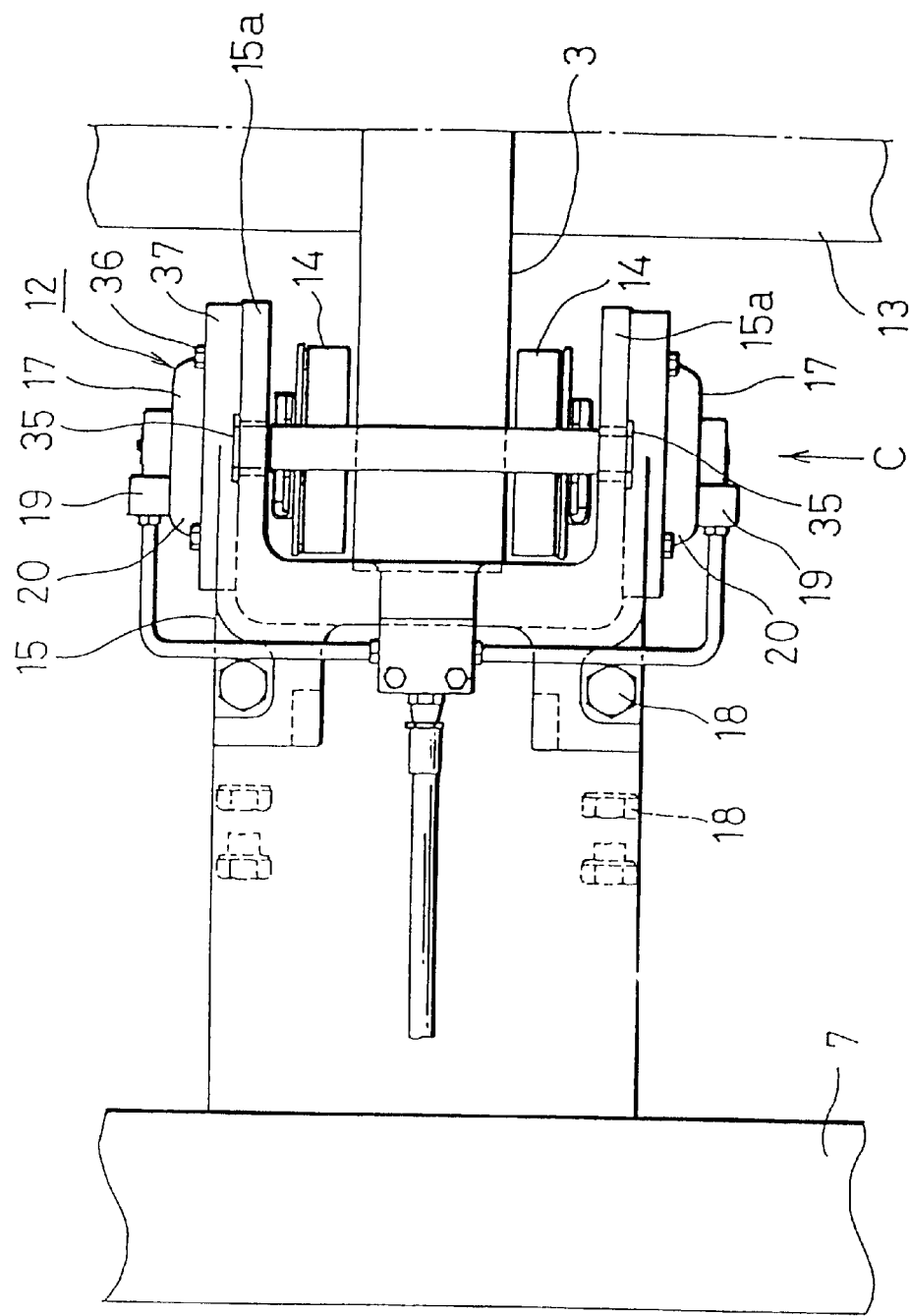
FIG. 1 an view of a main part of an embodiment of an air disc brake according to the present invention.

In the drawings, the reference numeral 3 designates a rotor; 7, a truck frame; 12, an air disc brake; 14, brake blocks; 15, a caliper body; 15a, leg portions; 16, cavities; 17, air chambers; 20, housing plate materials; 25, pressure chambers; 27, diaphragms; 29, pistons; 29a, plates; 29b, head portions; 31, return springs; 33, opening portions; and 35, guide portions.

BEST MODE FOR CARRYING OUT THE INVENTION

A preferred embodiment of the air disc brake according to the present invention will be described below in detail.

Figure 2:
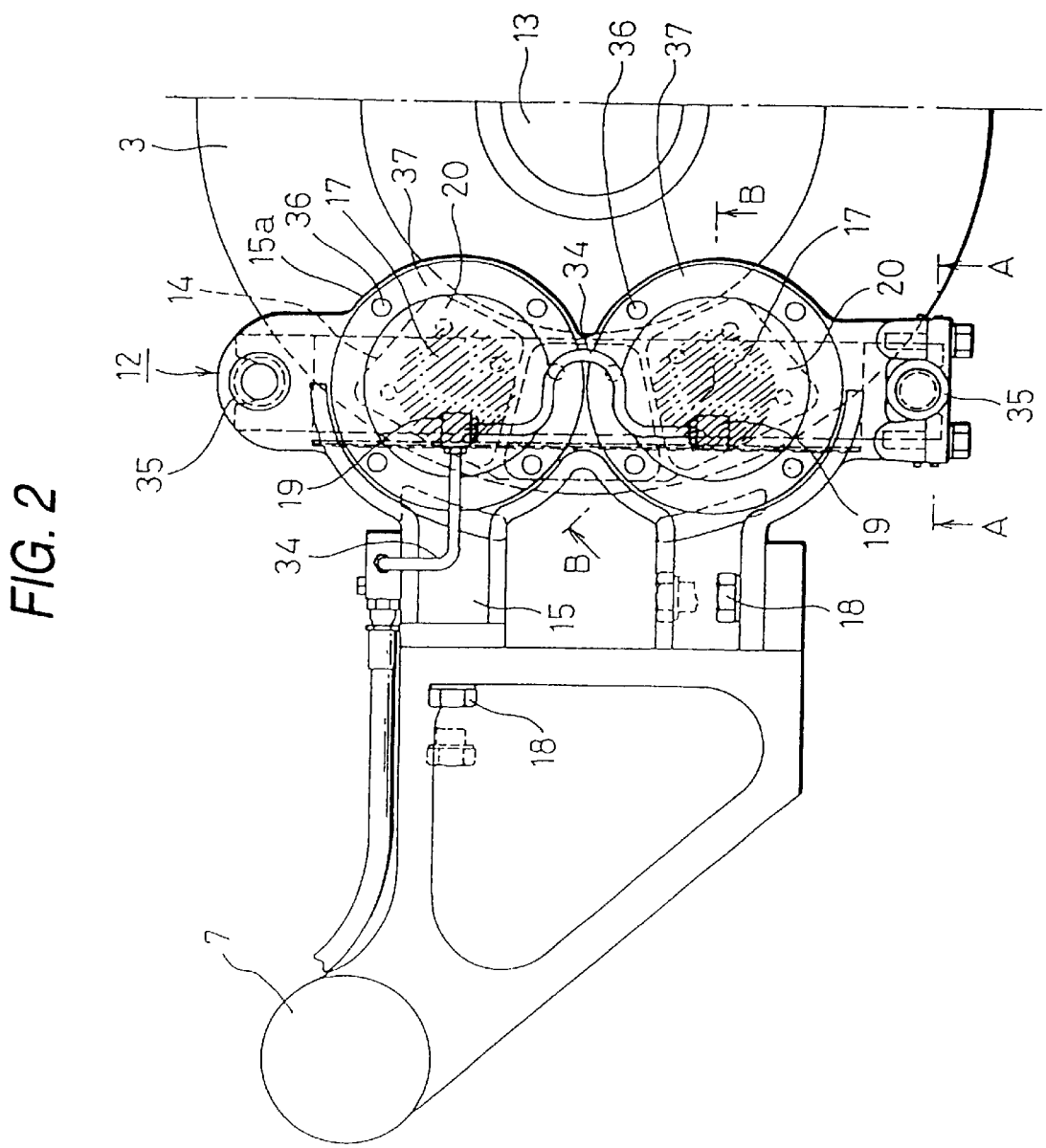
FIG. 2 is a view from the arrow C in FIG. 1.
Figure 3:
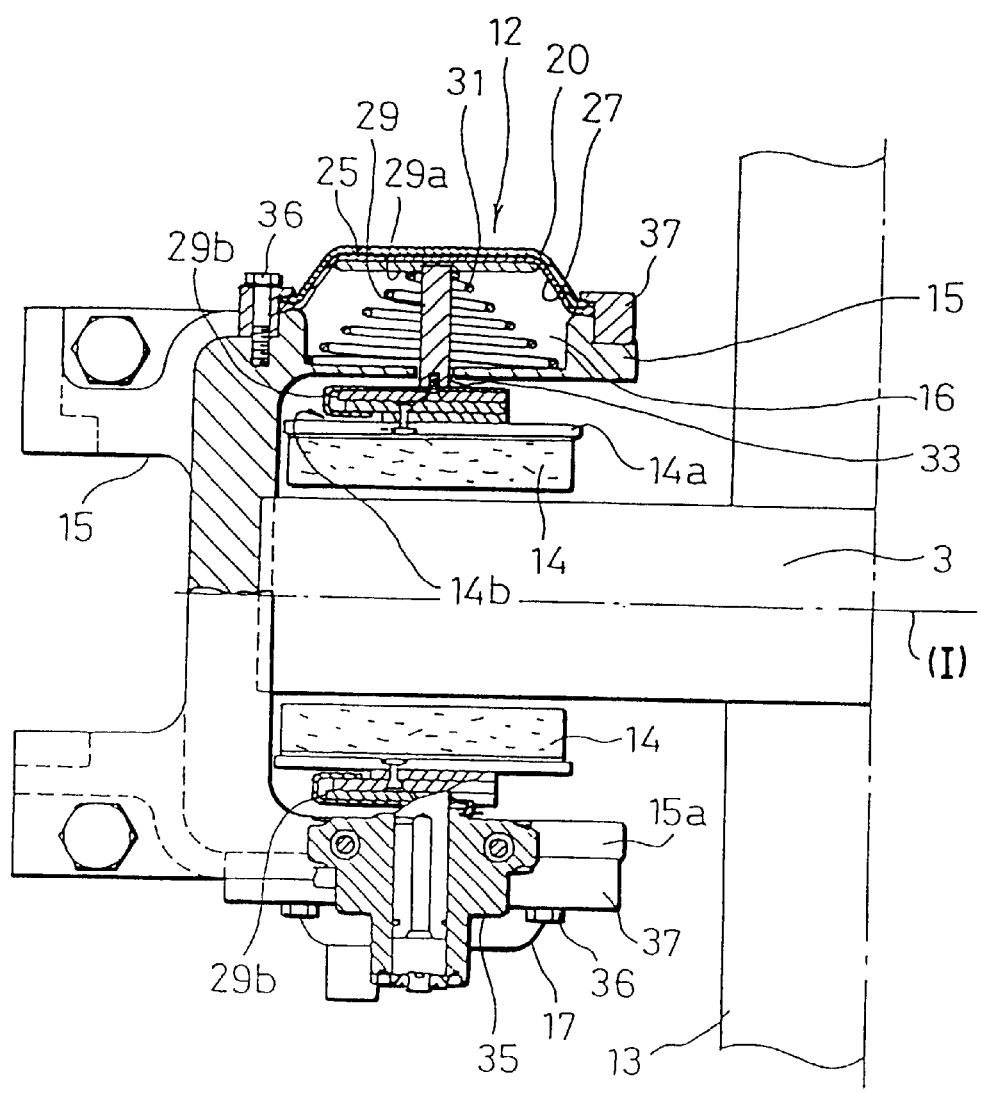
FIG. 3 is a partly sectional view of the air disc brake depicted in FIG. 1 and is separated by the center line A into a lower half which is a sectional view of a guide portion expressed by the line A—A in FIG. 2, and a lower half which is a sectional view of an air chamber expressed by the line B—B in FIG. 2.

FIGS. 1 to 3 show an embodiment of the air disc brake according to the present invention. FIG. 1 is a plan view of a main part of an embodiment of the air disc brake according to the present invention; FIG. 2 is a view from the arrow C in FIG. 1; and FIG. 3 is a partly sectional view of the air disc brake depicted in FIG. 1 and is separated by the center line (I) into a lower half which is a sectional view of a guide portion expressed by the line A—A in FIG. 2, and an upper half which is a sectional view of an air chamber expressed by the line B—B in FIG. 2.

Incidentally, this embodiment will be described about the case where the air disc brake is applied to a railroad vehicle.

In this embodiment, the air disc brake 12 is configured as follows. A pair of brake blocks 14, 14 are disposed in opposition to each other so that a disc-like rotor 3 which rotates integrally with a not-shown wheel of a railroad vehicle is put between the brake blocks 14, 14. The brake blocks 14, 14 are pressed against the rotor 3 by air pressure to thereby generate a braking force.

Specifically, as shown in FIGS. 1 and 2, the air disc brake 12 in this embodiment is configured so that a pair of leg portions 15a, 15a disposed in opposition to each other to put the rotor 3 therebetween are provided integrally with a caliper body 15 fixed to a truck frame 7 of a railroad vehicle. The pair of leg portions 15a, 15a are provided with cavities 16 serving as spaces for receiving air chambers 17 respectively.

The rotor 3 is fixed to the an axle 13. Further, the caliper body 15 is fixed to the truck frame 7 by truck-attachment bolts 18.

Further, as shown in FIG. 2, the aforementioned leg portions 15a have cavities 16 formed in two, upper and lower places at a distance in the circumferential direction of the rotor 3. Air chambers 17 are built into the cavities 16 respectively. The respective cavities 16 penetrates in the axial direction of the rotor. An opening 33 is narrowed on the rotor 3 side to an extent that there is no obstacle to the forward and backward movement of a piston 29 of the air chamber 17 which will be described later on the other hand, the opening on the side opposite to the rotor 3 is widened so that a diaphragm 27 which will be described later is set at the this opening.

Incidentally, the size of the opening 33 is set to be suitably larger than the outer diameter of the piston 29 to thereby permit the moderate oscillating behavior of the piston 29.

The air chambers 17 are provided to press the brake blocks 14 against the rotor 3.

In this embodiment, as shown in FIG. 3, each of the air chambers 17 is constituted by a housing plate material 20 attached to the leg portion 15a so as to cover the cavity 16; a diaphragm 27 defining a pressure chamber 25 in the cavity 16 with the housing plate material 20 so as to be swollen to the rotor 3 side in the cavity 16 by air pressure supplied to the pressure chamber 25; a piston 29 having a base end which is in contact with the diaphragm 27 in the cavity 16 and having a tip end which is protruded from the cavity 16 to the rotor 3 side and provided with a head portion 29b connected to the brake block 14; and a return spring 31 provided in the cavity 16 to urge the piston 29 in the direction to move apart from the rotor 3.

As shown in FIGS. 1 and 2, each of the housing plate materials 20 is provided with a supply port 19 for supplying air pressure to the pressure chamber 25. Further, an air piping 34 extending from a compressed air supply means (not shown) is connected to the supply ports 19.

Further, in this embodiment, each of the housing plate materials 20 is fastened to the leg portion 15a by a ring-like retainer 37 fixed to the leg portion 15a by bolts 36. Although the retainer 37 may be integrated with the housing plate material 20, this embodiment shows the case where the retainer 37 and the housing plate material 20 are provided separately.

The circumferential edge portion of the diaphragm 27 is put between the housing plate material 20 and the leg portion 15a, so that the diaphragm 27 is fixedly held.

Further, in this embodiment, as the return spring 31, a spiral type compression coiled spring in which the diameter of winding of a spring wire material is reduced gradually in a direction of from one end side to the other end side is used as shown in FIG. 3.

The piston 29 is configured so that its base end is provided with a plate 29a which is in contact with the diaphragm 27 and its tip end is provided with a head portion 29b connected to the brake block 14. At least the head portion 29b is made of a low heat-conductive material.

Suitable examples of the low heat-conductive material include: thermally moldings of glass fiber cloth with thermosetting resin such as a phenol resin, or the like; a stainless steel plate with its surface spray-coated with ceramics; or the like.

As shown also in FIG. 3, the pair of brake blocks 14 are configured so that opposite end portions are slidably guided in the axial direction of the rotor 3 by guide portions 35 which are constituted by guide pins and guide holes.

Further, in this embodiment, each of the head portions 29b is formed to have a substantially U-shaped clip structure in which the connection of the head portion 29b with the brake block 14 can be achieved easily only by inserting the head portion 29b into a fitting plate portion 14b formed on a back plate 14a of the brake block 14.

In the configuration of the air disc brake 12 of this embodiment, the diaphragms 27 in the air chambers 17 are displaced in the cavities 16 toward the rotor 3 side when air pressure is supplied to the pressure chambers 25 in the air chambers 17, respectively. The displacement of the diaphragms 27 is transmitted directly to the brake blocks 14 by the pistons 29 with their base end portions in contact with the diaphragms 27, respectively. Accordingly, the brake blocks 14 with their opposite end portions slidably guided in the axial direction of the rotor by the guide portions 35 constituted by guide pins and guide holes are pressed against the rotor 3, and a braking state is achieved.

When the supply of the air pressure to the pressure chambers 25 is stopped, the diaphragms 27 are returned to their initial positions by the urging force of the return springs 31. As a result, the brake blocks 14 move apart from the rotor 3. In such a manner, a non-braking state is achieved.

Figure 4:
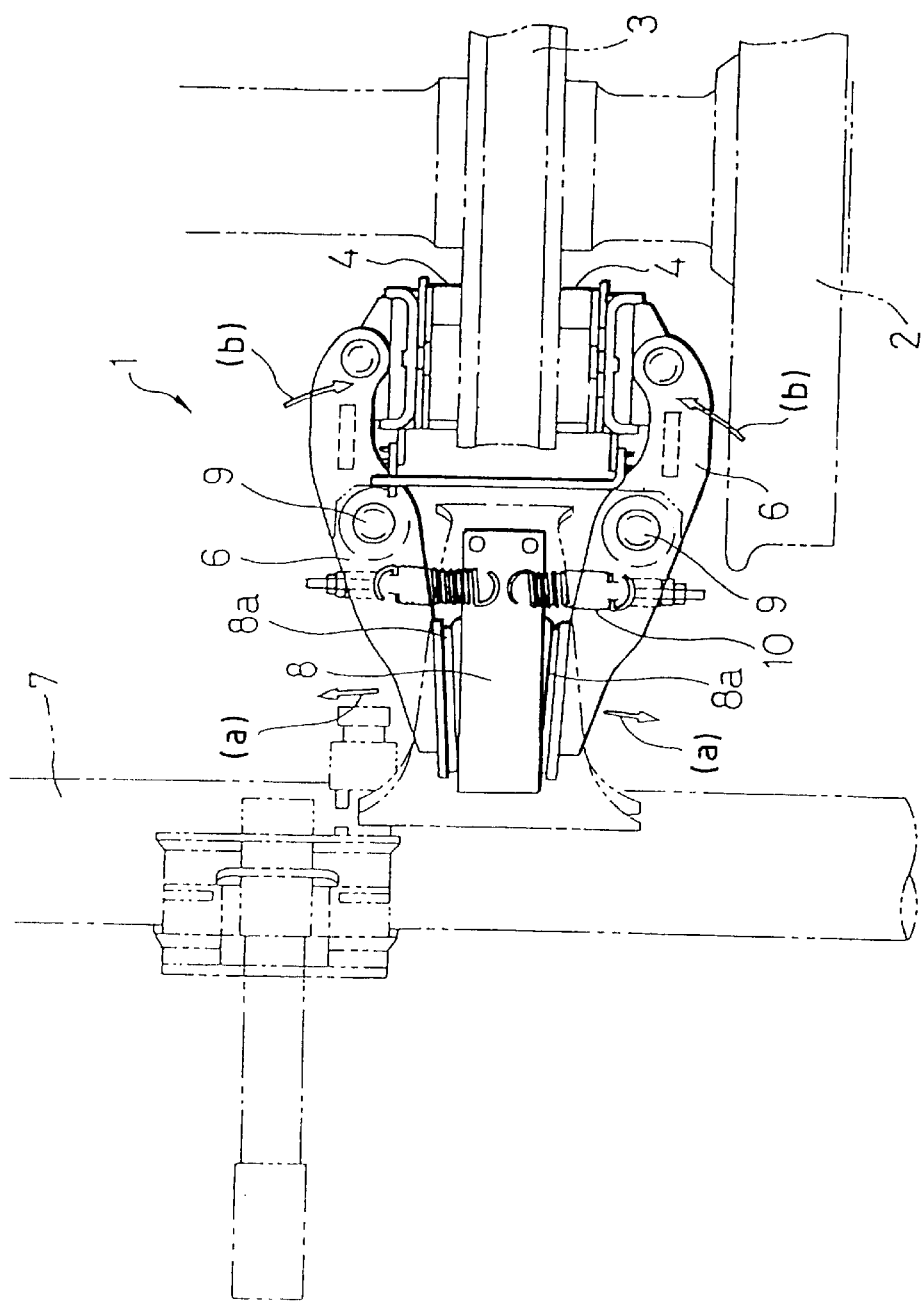
FIG. 4 is a plan view of a main part of a conventional air disc brake for a railroad vehicle.

As described above, the air disc brake 12 in this embodiment is configured so that the swelling displacement of the diaphragms 27 in the air chambers 17 is transmitted directly to the brake blocks 14. In comparison with the background-art air disc brake 1 (FIG. 4) having lever members and mechanisms of rotatably supporting the lever members, the number of parts can be reduced by the omission of the lever members and the mechanisms of supporting the lever members. As a result, not only reduction in size and weight but also reduction in cost can be attained.

Further, since the swelling displacement of the air chambers 17 is transmitted directly to the brake blocks 14, responsibility can be improved by heightening the control speed of the air pressure supply to the air chambers 17.

Further, the movement of the axle at the time of braking is permitted by the elastic deformation of the diaphragms 27 and the return springs 31 supporting the pistons 29 in the air chambers 17, so that the impact load acting on the constituent parts such as the pistons 29, etc. due to the movement of the axle at the time of braking can be relaxed. Accordingly, the fatigue of the constituent parts such as the pistons 29, etc. connected to the brake blocks 14 can be reduced.

Further, the return springs 31 are spiral type compression coiled springs. Accordingly, in the case where each of the return springs 31 is compressively deformed by the swelling displacement of the diaphragm, the small-diameter winding of the spring is accommodated in the inside of the large-diameter winding of the same spring. As a result, the spaces occupied by the respective return springs 31 in the axial direction becomes very small. Accordingly, the return springs 31 can be received in the cavities 16 of the respective leg portions 15a of the caliper body 15 within the small spaces, so that further reduction in size of the brake apparatus can be attained.

Further, in this embodiment, the piston 29 in each of the air chambers 17 is configured so that at least the head portion 29b is made of a low heat-conductive material. Accordingly, frictional heat at the time of braking can be prevented from being transmitted from the braking blocks 14 to the air chambers 17 through the pistons 29, and as a result, the pressing force of the brake blocks 14 can be prevented from being changed by the change of air pressure due to the temperature rising in the air chambers 17. Accordingly, the bad influence of thermal deformation of the diaphragms 27, or the like, can be prevented.

Further, in this embodiment, the opening portions 33 which are located in the leg portions 15a and through which the pistons 29 in the air chambers 17 pass, respectively, are configured so that the diameter of each of the opening portions 33 is set to be larger than the diameter of the piston 29 so as to permit the suitable oscillating behavior of the piston 29. Accordingly, even if the rotor 3 moves eccentrically in a radial direction at the time of braking, the brake blocks 14 can be kept in a state of being pressed against the rotor 3 by a stable pressing force resulted from the oscillating behavior of the pistons 29. As a result, the following property of the brake blocks 14 after the rotor 3 can be improved.

Incidentally, as a matter of course, the design for the air disc brake according to the present invention as to the specific shapes, numbers, etc. of various constituent parts may be changed suitably without departing from the spirit of the present invention.

Although the aforementioned embodiment has been described about the case where the air disc brake according to the present invention is applied to a railroad vehicle, it is a matter of course that the present invention may be applied to a large-sized vehicle, or the like, so long as a space for setting the air disc brake can be secured.

INDUSTRIAL APPLICABILITY

The air disc brake for a railroad vehicle according to the present invention is configured so that the swelling displacement of the air chambers is transmitted directly to the brake blocks. In comparison with the conventional air disc brake having lever members and mechanisms of rotatably supporting the lever members, the number of parts can be reduced by omitting the lever members and the mechanisms of supporting the lever members. Accordingly, not only reduction in size and weight but also reduction in cost can be attained.

Further, because the swelling displacement of the air chambers is transmitted directly to the brake blocks, responsibility can be improved by high-speed control of the air pressure supply to the air chambers.

Further, the movement of the axle at the time of braking is permitted by the elastic deformation of the diaphragms and return springs supporting the pistons in the air chambers. Since the impact load acting on constituent parts such as the pistons, etc. due to the movement of the axle at the time of braking can be relaxed, the fatigue, due to the impact load, of the constituent parts connected to the brake blocks can be reduced.

Further, in the case where a spiral type compression coiled spring in which the winding diameter of the spring wire material is reduced gradually in a direction of from one end side to the other end side is used as the return spring, the small-diameter winding of the spring is received in the inside of the large-diameter winding of the spring if the return spring is compressively deformed by the swelling displacement of a corresponding diaphragm. As a result, the space occupied by the return spring in the axial direction becomes very small. Accordingly, the return springs can be set in cavities of the leg portions of the caliper body to save spaces, so that further reduction in size of the brake apparatus can be attained.

What is claimed is:

1. An air disc brake in which a pair of brake blocks disposed in opposition to each other so as to put therebetween a rotor rotating integrally with a wheel are pressed against said rotor by air pressure to thereby generate a braking force, wherein a pair of leg portions in opposition to each other so as to put therebetween said rotor are provided in a caliper body fixed to a truck frame, said pair of leg portions being provided with cavities serving as spaces for receiving air chambers respectively; and each of said air chambers includes a housing plate material attached to said leg portion so as to cover said cavity and provided with air pressure supply port formed therein, a diaphragm defining a pressure chamber in said cavity and between said housing plate material and said diaphragm so that said diaphragm is moved in said cavity so as to be swollen toward the rotor side by air pressure supplied to said pressure chamber, a piston having a base end in contact with said diaphragm and a tip end protruded from said cavity and provided with a head portion connected to said brake block, and a return spring provided in said cavity for urging said piston to move apart from said rotor.

2. The air disc brake according to claim 1, wherein said return spring is a spiral type compression coiled spring which is formed so that the diameter of winding of a spring wire material is reduced gradually in a direction of from one end side to the other end side.

* * * * *